(12) United States Patent
Hoffmann

(10) Patent No.: US 9,610,890 B2
(45) Date of Patent: Apr. 4, 2017

(54) METHOD FOR CONTROLLING THE ILLUMINATION OF A ROAD PROFILE

(71) Applicant: HELLA KGaA Hueck & Co., Lippstadt (DE)

(72) Inventor: Ingo Hoffmann, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 99 days.

(21) Appl. No.: 14/492,134

(22) Filed: Sep. 22, 2014

(65) Prior Publication Data

US 2015/0085506 A1 Mar. 26, 2015

(30) Foreign Application Priority Data

Sep. 23, 2013 (DE) .................. 10 2013 219 096

(51) Int. Cl.
*B60Q 1/08* (2006.01)

(52) U.S. Cl.
CPC ........ *B60Q 1/085* (2013.01); *B60Q 2300/056* (2013.01); *B60Q 2300/32* (2013.01)

(58) Field of Classification Search
CPC ................ B60Q 1/085; B60Q 2300/32; B60Q 2300/056
See application file for complete search history.

(56) References Cited

U.S. PATENT DOCUMENTS

| | | | | |
|---|---|---|---|---|
| 7,703,955 | B2 * | 4/2010 | Watanabe | B60Q 1/085 362/464 |
| 2007/0230199 | A1 * | 10/2007 | Eberhardt | B60Q 1/085 362/466 |
| 2008/0262681 | A1 * | 10/2008 | Morishita | B60Q 1/12 701/49 |
| 2009/0254247 | A1 * | 10/2009 | Osanai | B60Q 1/143 701/36 |
| 2011/0012511 | A1 * | 1/2011 | Watanabe | B60Q 1/085 315/82 |
| 2014/0249715 | A1 | 9/2014 | Faber et al. | |

FOREIGN PATENT DOCUMENTS

| | | |
|---|---|---|
| DE | 101 12 996 A1 | 9/2002 |
| DE | 102 54 806 A1 | 6/2004 |
| DE | 10 2005 032 848 A1 | 1/2007 |
| DE | 10 2006 016 071 A1 | 10/2007 |
| DE | 10 2008 000 091 A1 | 8/2008 |
| DE | 10 2007 040 042 A1 | 2/2009 |
| DE | 10 2011 081 397 A1 | 2/2013 |
| JP | EP 2484557 A2 * | 8/2012 ............... B60Q 1/12 |

OTHER PUBLICATIONS

German Search Report, Appl. No. 10 2013 219 096.4, Feb. 24, 2014, 5 pgs.

* cited by examiner

*Primary Examiner* — Elmito Breval
(74) *Attorney, Agent, or Firm* — Paul D. Strain, Esq.; Strain & Strain PLLC

(57) ABSTRACT

The invention relates to a method for controlling illumination of a road profile, wherein the headlamp at least one light-emitting element, wherein the at least one light-emitting element is individually drivable in order to generate an individual luminous flux, wherein the light emitted by the at least one light-emitting element has a light distribution, wherein the lateral adaptation of the light distribution is performed depending on a determined road profile, in particular as a function of the distance from the headlamp.

14 Claims, 7 Drawing Sheets

METHOD FOR CONTROLLING THE ILLUMINATION OF A ROAD PROFILE

CROSS-REFERENCE TO RELATED PATENT APPLICATIONS

This application is based upon and claims the benefit of priority from prior German Patent Application No. 10 2013 219 096.4, filed Sep. 23, 2013, the entire contents of which are incorporated herein by reference in their entirety.

TECHNICAL FIELD

The invention relates to a method for controlling the illumination of a road profile, in particular by means of a fully adaptive headlamp, in particular of a motor vehicle.

PRIOR ART

DE 10 2008 000 091 A1 discloses an apparatus for controlling a lighting angle of headlamps of a vehicle, in which the radius of a bend is determined from the present position and road information and a lighting angle is determined on the basis of these data and a distance. As a result, the road is, however, only partially illuminated by pivoting of the headlamp as such on the bend.

DE 101 12 996 A1 discloses a method for adjusting a headlamp angle during cornering, wherein, once the apex of the curve has been reached, the headlamp is reset more quickly than the radius of the bend decreases.

DESCRIPTION OF THE INVENTION, PROBLEM, SOLUTION, ADVANTAGES

The object of the invention consists in providing a method for controlling illumination of a road profile, in particular by means of a fully adaptive headlamp, which enables improved illumination of the road, in particular on bends.

The total light distribution, merely referred to below as light distribution, results from the superimposition of the individual light distributions of the individual light-emitting elements.

The problem in respect of the method is solved by the features of claim 1.

An exemplary embodiment of the invention relates to a method for controlling illumination of a road profile, wherein the headlamp at least one light-emitting element, wherein the at least one light-emitting element is individually drivable in order to generate an individual luminous flux, wherein the light emitted by the at least one light-emitting element has a light distribution, wherein the lateral adaptation of the light distribution is performed depending on a determined road profile, in particular as a function of the distance from the headlamp.

It is advantageous if the lateral adaptation of the light distribution is adapted depending on a determined road profile as a function of the distance of the road region lit by the respective light-emitting element from the headlamp.

In this case, it is particularly advantageous if the light distribution is defined by means of a predefined three-dimensional basic distribution, wherein matching of the light distribution to the profile of the road or the predicted trajectory of the specific vehicle or a suitable combination of the profile of the road and the trajectory on the basis of selected parameters is performed. In this case, the basic distribution is matched corresponding to presettable parameters, namely the road profile or the trajectory of the vehicle or both in the lateral direction. If, for example, the road or the trajectory has a bend or several bends, the adapted light distribution will also be matched to these bends or curvatures and have such bends or curvatures or map such bends or curvatures or approximate them. As a result, improved illumination of the road or the roadway can be provided. In this case, the road and roadway are used synonymously.

Furthermore, it is advantageous if presets are taken into consideration in the definition of the light distribution. In this case, the light distribution can be matched corresponding to the road profile and/or the trajectory of the vehicle in the lateral direction only insofar as this is permitted by the presets. In particular, the parameters by means of which the matching is performed can be restricted to value ranges depending on a set of rules, which map the presets. These value ranges can be predefined, for example, or restricted depending on other parameters, in particular the presently set value of at least one other parameter.

It is particularly advantageous if the three-dimensional light distribution is adjusted in accordance with at least one of the following parameters:
  lateral lane profile
  vertical lane profile
  lateral offset of the lane
  angle of the lane profile
  curvature of the lane profile
  change in curvature of the lane profile
  lane width
  width profile of the lane and/or
  predicted trajectory of the specific vehicle, in particular in a 3D environment.

In this case, the width profile of the lane can also be understood to mean junctions and intersections.

Furthermore, it is advantageous if the light distribution is determined in matched fashion three-dimensionally for various distance ranges. Correspondingly, a road profile can be divided into distance ranges, whose illumination can be matched or formed differently.

It is also advantageous if a determination of the distance between the headlamp and the road is performed for various vertical angles and a correspondingly matched light distribution is determined for various distances resulting from the respective vertical angle.

Furthermore, it is advantageous if the light distribution takes place by distortion of a three-dimensional parameter field of a three-dimensional light distribution model.

In accordance with the invention, it is advantageous if a defined luminosity profile is generated following a detected curved road profile.

Further advantageous configurations are described by the description of the figures below and by the dependent claims.

BRIEF DESCRIPTION OF THE DRAWINGS

The invention will be explained in more detail below on the basis of at least one exemplary embodiment with reference to the drawings, in which.

PREFERRED EMBODIMENT OF THE INVENTION

Figure 1:
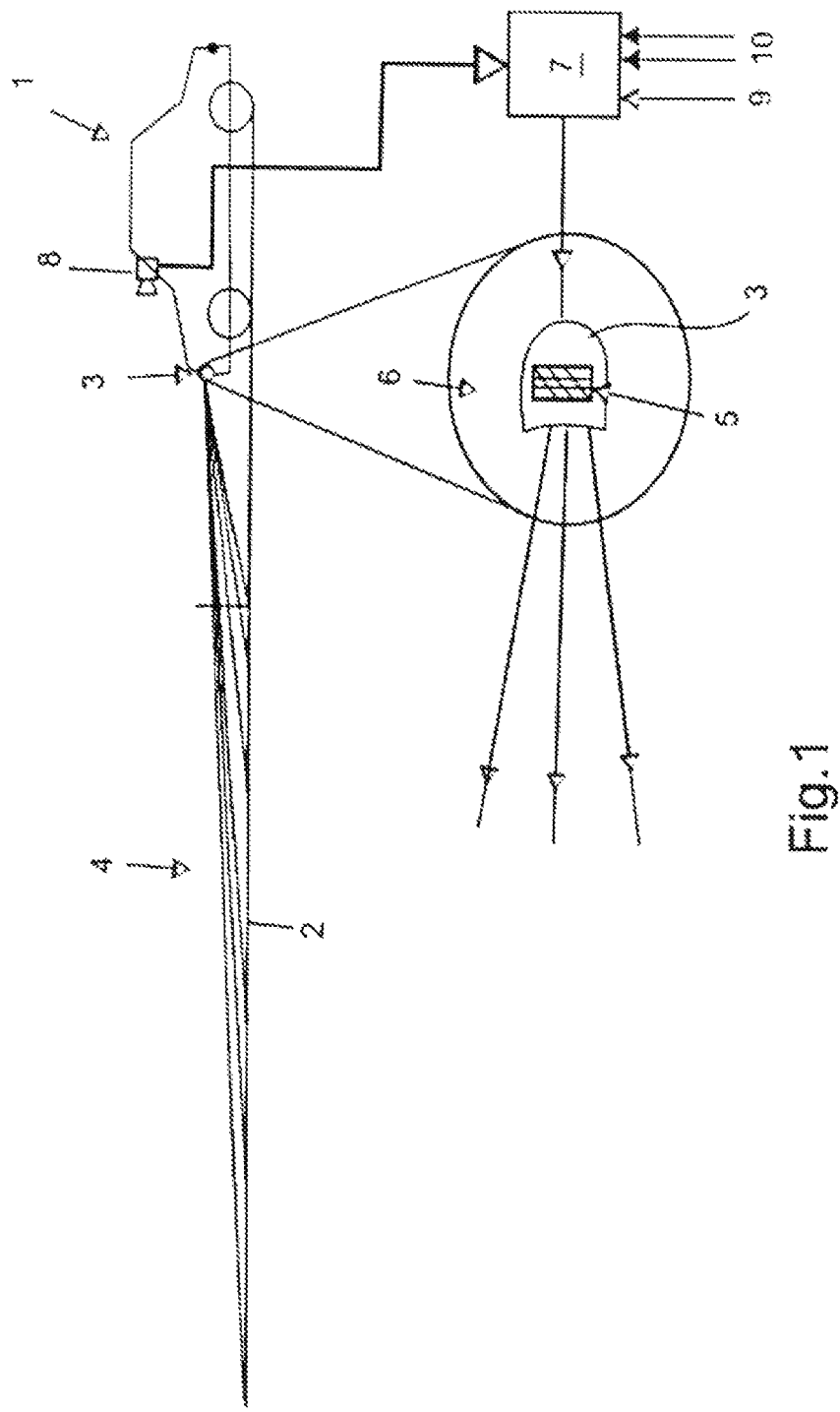
FIG. 1 shows a schematic view of a motor vehicle comprising a headlamp for illuminating the driving lane.

FIG. 1 shows a motor vehicle 1 on a road or on a driving lane 2 of the road, wherein the motor vehicle 1 has at least one headlamp 3, for illuminating the driving lane 2. The headlamp in this case is used for generating a light distribution 4, by means of which the driving lane 2 and possibly regions in the surrounding area thereof.

In this case, the headlamp is preferably a headlamp comprising a light-emitting means and/or comprising a multiplicity of light-emitting means and/or comprising a shield and/or comprising a multiplicity of shield elements, in particular a headlamp comprising a matrix 5 of light-emitting elements and/or comprising a matrix of shield elements, wherein the light-emitting elements and/or the shield elements are individually drivable in order to drive an individual luminous flux of a light-emitting element.

In this case, the three-dimensional light distribution of the headlamp is defined by means of a predefined basic distribution, wherein, owing to environmental conditions or other influencing conditions, the actual light distribution is generated by adaptation from the basic light distribution. For this purpose, an adapted light distribution is varied on the basis of the basic distribution using selected parameters.

In this case, the light-emitting elements 5, in particular the matrix 6 of light-emitting elements, are driven by means of a control unit 7, wherein the control unit determines or recognizes the basic light distribution on the basis of a set of parameters in this regard and determines the adapted light distribution on the basis of varied parameters from the basic light distribution. In this case, the light-emitting elements are then driven in such a way that the adapted light distribution results.

In order to determine the present conditions, the control unit 7 can receive data or signals from sensors 10 and/or other devices 8 or control units 9. Thus, for example, data or signals can be received from an installed camera 8 in order to determine the ambient conditions. Furthermore, at least one set of rules for adhering to presets can be loaded from a store, which is not illustrated, for example. This can be selected in particular depending on the present location of the vehicle.

Figure 2:
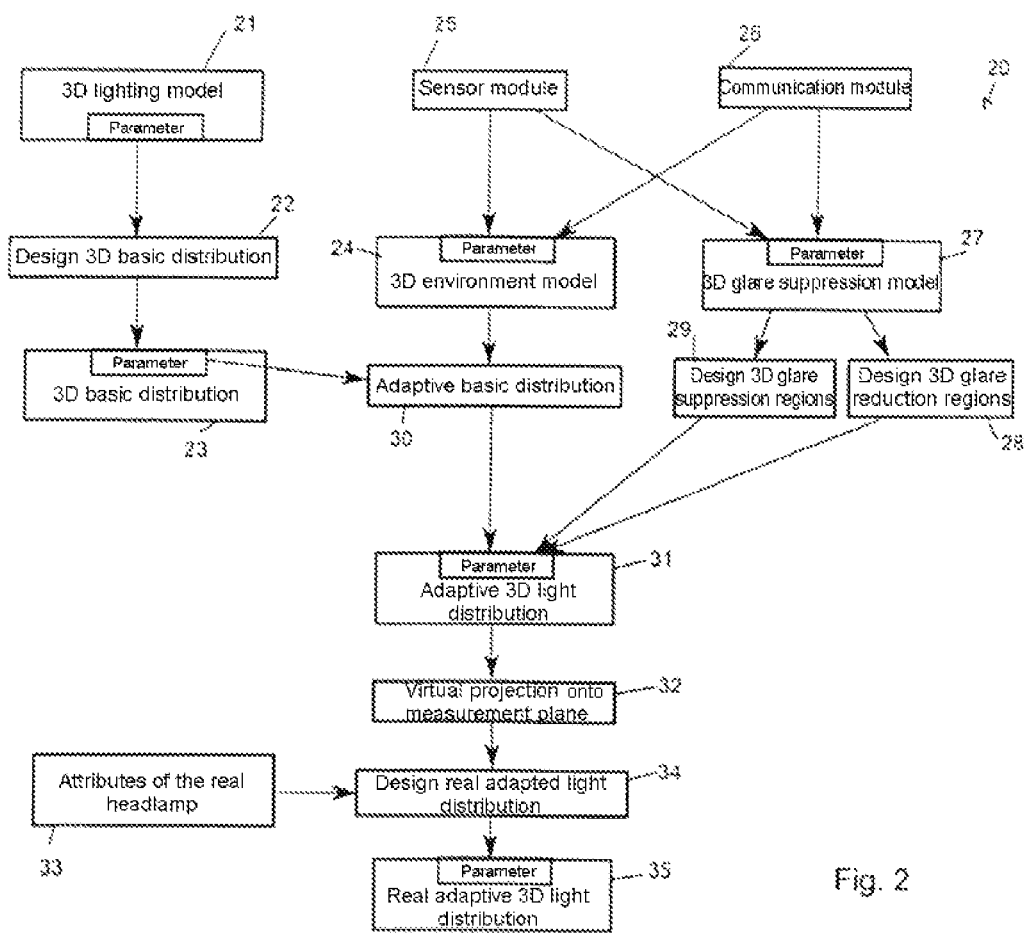
FIG. 2 shows an illustration of a block circuit diagram for explaining the method.

FIG. 2 shows a block circuit diagram 20 for explaining the method according to the invention.

In this case, the method relates to a method for controlling a light distribution of a headlamp, wherein the headlamp has at least one light-emitting element or a multiplicity of light-emitting elements, preferably a matrix of light-emitting elements, which are individually drivable. As a result, an individually drivable luminous flux is generated in order to be able to generate an adaptable light distribution in front of the motor vehicle 1.

In accordance with the invention, the light distribution is defined by means of a predefined three-dimensional basic distribution on the basis of parameters. In block 21, a three-dimensional lighting model is generated on the basis of a set of parameters, wherein, by means of a design 3D basic light distribution according to block 22, a three-dimensional basic light distribution with the parameters in this regard according to block 23 is defined on the basis of the lighting model according to block 21.

An adapted light distribution is varied in accordance with the invention on the basis of the basic distribution according to block 23 using selected varied parameters.

In order to determine the basic light distribution, correspondingly a three-dimensional lighting model is used for illuminating the environment to be lit (see block 21), wherein the parameters of the basic light distribution are determined on the basis of the requirements for the illumination of the environment.

In this case, at least one or more of the following parameters are used as parameters of the basic distribution:

the defined profile of the longitudinal illumination in front of the headlamp up to a predefined distance, the defined profile of the lateral illumination in front of the headlamp, lateral and/or longitudinal lighting model in the forefield of, such as in particular in the vicinity of, the vehicle, the definition of an upper beam spot, direction and characteristic of upper beam spots, dependence thereon of the driving lane profile and change in position and deformation thereof in this regard, profile of the driving lane to be lit taking into consideration the road profile, such as in particular the vertical and/or lateral profile and the profile of the trajectory of the specific vehicle and/or a combination of the profiles of the road profile and/or the trajectory, constant parameterization of the transition region between the upper beam spot and the forefield as a function of the solid angle, definition of a transition region between illumination of the roadway and the upper beam spot, and/or individual or multiple glare suppression regions and forms for reducing the intensity of the light as a function of the solid angle, the distance from the object and the local headlamp intensity.

The environment to be lit is described by means of a predefined environment model. This environment model is described in block 24 on the basis of a set of parameters in this regard comprising corresponding parameters. The input data for the environment model is received by the model from sensors, control units or other devices (see blocks 25, 26). In this case, block 25 represents, as sensor module, sensors and control units, for example, and block 26 represents, as communication module, control units and other devices such as camera, navigation device, radar device etc. The data and/or signals of blocks 25, 26 are supplied to the environment model in block 24.

In this case, it is advantageous if the environment model takes into consideration the following factors:

the 3D surfaces in the surrounding area, such as lateral and vertical profile of the roadway or the predicted trajectory of the specific vehicle, road side, side development or vegetation cover, proportion of the reflection of the emitted light back in the direction of the driver's eye, in particular taking into consideration the parallaxes between the lighting angle and viewing angle and the angular difference between the surface normal and the lighting angle, in particular depending on the material, color, possibly fog, the position and dynamics of objects for which glare suppression would be required, and/or the position and dynamics of retroreflectors.

Correspondingly, environmental parameters are taken into consideration in the determination of the adapted light distribution as parameters for describing the environment to be lit.

In accordance with the invention, the environment model describes the environment by means of parameters which can be determined by means of sensor input data and/or communication input data (see blocks 25, 26). In this case, environmental parameters, vehicle parameters and/or glare suppression parameters are used as parameters.

In order to determine the environment using the environment model in block 24, it is possible to use the following as environmental parameters:

presence of a type of road (highway, urban road, extra-urban road), road profile (relative to the vehicle, lateral and/or vertical), predicted vehicle trajectory, driving dynamics of the vehicle, traffic situation, hazards, weather conditions, visual conditions, external lighting, contrast, daylight, and/or ambient luminosity.

The following are usable as vehicle parameters:

vehicle position, vehicle orientation, velocity, set driving parameters, driver profile, and/or vehicle trajectory.

In block 27, the way in which the light distribution should be subjected to glare suppression because, for example, other road users or the like have been determined which should not be subjected to glare is determined using the glare suppression model. In this case, a three-dimensional glare suppression model which is based on a set of parameters comprising glare suppression parameters is determined in block 27. The glare suppression model receives data and/or signals, as does the environment model already, from blocks 25 and 26.

The following are usable as glare suppression parameters:

position of other vehicles, position of group of other vehicles, position of road users, position of retroreflectors, dynamics of other vehicles, dynamics of group of other vehicles, dynamics of road users, and/or dynamics of retroreflectors.

From the glare suppression model according to block 27, the regions to be subjected to glare suppression are defined in block 29. In this case, the configuration thereof is also defined. The glare suppression model likewise defines those regions which have reduced lighting, i.e. lighting reduction regions, in order to achieve reduced glare; see block 28.

In block 30, an adapted basic light distribution is determined from the three-dimensional basic light distribution and the three-dimensional environment model. The determination can in this case take place optimally and/or taking into consideration presets. For this purpose, a set of rules relating to the respective presets can be selectable. In particular, the permissible value ranges of the parameters can be preset by the corresponding set of rules.

In block 31, an adapted three-dimensional light distribution is determined from the three-dimensional basic light distribution according to block 30 and the regions to be subjected to glare suppression according to block 29 and the regions with reduced lighting according to block 28. In this case, the determination can take place optimally and/or taking into consideration presets. For this purpose, a set of rules can be selectable in customer-specific, manufacturer-specific and/or country-specific fashion, for example.

In order to determine an adapted light distribution, the basic light distribution is matched to the environment to be illuminated, the glare suppression regions and/or to the lighting reduction regions, wherein the adapted light distribution originates from the basic distribution by adaptation of parameters.

In this case, the parameters of the environment are mapped onto the parameters and/or the changeable variables of the basic light distribution in order to determine an ideal three-dimensional light distribution which is adequate for the situation.

As an alternative or in addition, a three-dimensional light distribution which is adequate for the situation and corresponds to the presets of the selected set of rules can be determined. The mapping of the parameters can therefore take place depending on the selected set of rules. In particular, the permissible value ranges of the parameters can be preset by the corresponding set of rules. The set of rules can in this case relate to all parameters used, in particular to the parameters of the adapted three-dimensional light distribution; see block 31.

In block 32, a virtual projection of the adapted three-dimensional light distribution onto the measurement plane then optionally takes place.

In particular, it is necessary to take into consideration if different parameters of the environment model, for example, can have different effects on at least one parameter of the light distribution. In this case, for example, one parameter can require a reduction in the luminosity at a specific solid angle, while another parameter could require an increase in the luminosity. In such a case, a common parameter change is implemented, wherein the two affected parameters are taken into consideration combined, for example. For this purpose, averaging of the effects or weighting can be performed or a parameter is left unconsidered, while the other parameter is taken into full consideration etc. are combined. The individual effects can also be weighted individually in the determination of the common parameter change.

Furthermore, it is necessary to take into consideration the fact that, when mapping parameters, not every change to the glare suppression model, for example, has an effect on at least one parameter of the light distribution. In particular owing to the fact that presets are taken into consideration, it is possible for specific changes in the traffic in the surrounding area to have no effect on the light distribution since this already exhausts the permissible possibilities.

According to block 33, the respective headlamp has individual attributes which are based on the basis of its manufacture and make. These attributes can influence the light distribution to be generated because, for example, certain luminosities or light colors cannot be represented or can only be represented to a restricted extent. In block 34, the influencing of the adapted light distribution as a result of the headlamp and its attributes the real light distribution owing to the headlamp design is generated, which results in the real adapted light distribution with its parameters in block 35.

In this case, transitions between various adapted light distributions in respect of perceptibility and design are configurable differently, such as in particular the speed of the transition.

The method furthermore has the property that lateral adaptation of the light distribution is performed depending on a determined road profile, in particular as a function of the distance from the headlamp.

In this case, the light distribution is defined by means of a predefined three-dimensional basic distribution, wherein matching of the light distribution to the profile of the road or the predicted trajectory of the specific vehicle or a suitable combination of the profile of the road and the trajectory on the basis of selected parameters is performed. In this case, the three-dimensional light distribution is adjusted in accordance with at least one of the following parameters:
  lateral lane profile
  vertical lane profile
  lateral offset of the lane
  angle of the lane profile
  curvature of the lane profile
  change in curvature of the lane profile
  lane width
  width profile of the lane
  predicted trajectory of the specific vehicle, in particular in a 3D environment.

These parameters are advantageously determinable via an observation apparatus, such as a camera, laser scanner or the like or they are determinable from driving dynamics data and/or from the vehicle position and map data.

In this case, it is particularly advantageous if the light distribution is determined in matched fashion three-dimensionally for various distance ranges. Thus, the light distribution can be adapted in a manner also tracking a very modulated profile as a function of the distance.

In this case, a determination of the distance between the headlamp and the road is performed for various vertical angles so that a correspondingly matched light distribution can be determined for various distances resulting from the respective vertical angle.

Thus, as adaptation, the light distribution is obtained by distortion of a three-dimensional parameter field of a three-dimensional light distribution model.

The adapted light distribution therefore makes it possible to produce a defined luminosity profile following a detected curved road profile.

FIGS. 3 to 8 each show a light distribution.

Figure 3:
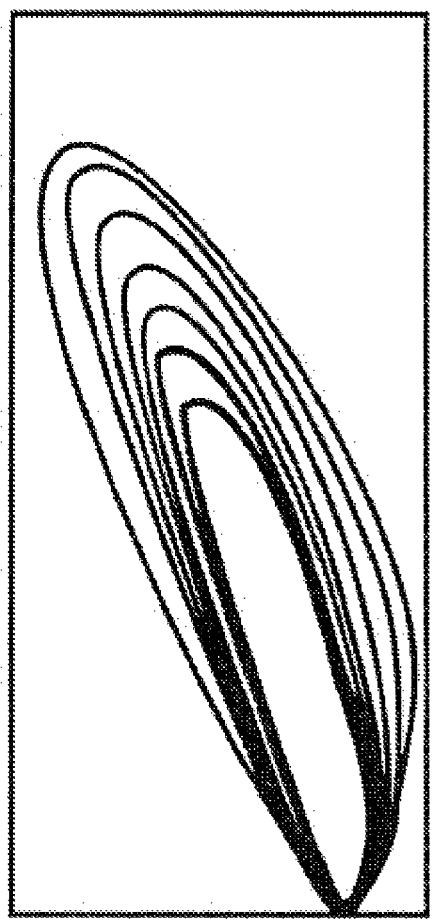
FIG. 3 shows an illustration of a light distribution from above onto a roadway with illumination of the bend in the roadway.

FIG. 3 illustrates a light distribution on the basis of a color representation or representation with shades of gray. The respective colors or shades of gray represent regions of the same luminosity. The curved profile of the regions of the same luminosity in the case of adaptation of the light distribution during cornering towards the left is shown.

Figure 4:
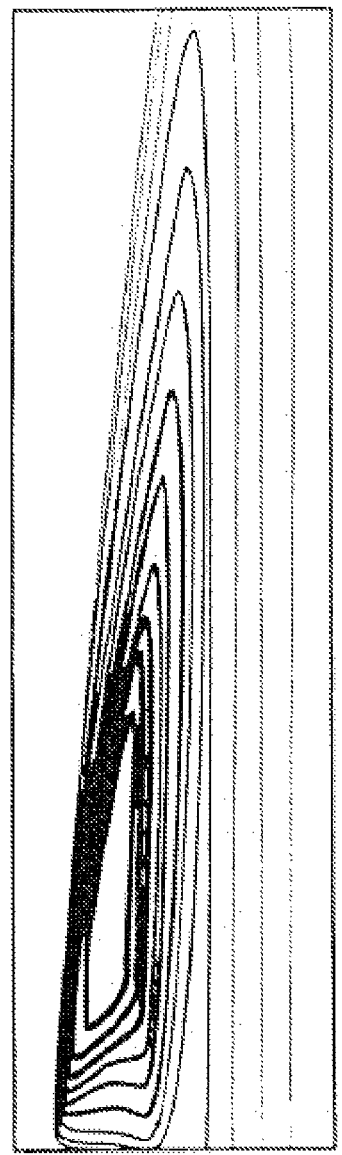
FIG. 4 shows an illustration of a light distribution from the point of view of the driver of the vehicle with illumination of the bend in the roadway.

FIG. 4 illustrates a light distribution on the basis of a color representation or representation with shades of gray, wherein the representation is from the point of view of the driver of the vehicle or from the point of view of the headlamp itself. The respective colors or shades of gray represent regions of the same luminosity. The curved profile of the regions of the same luminosity in the case of adaptation of the light distribution during cornering towards the left is shown.

Figure 5:
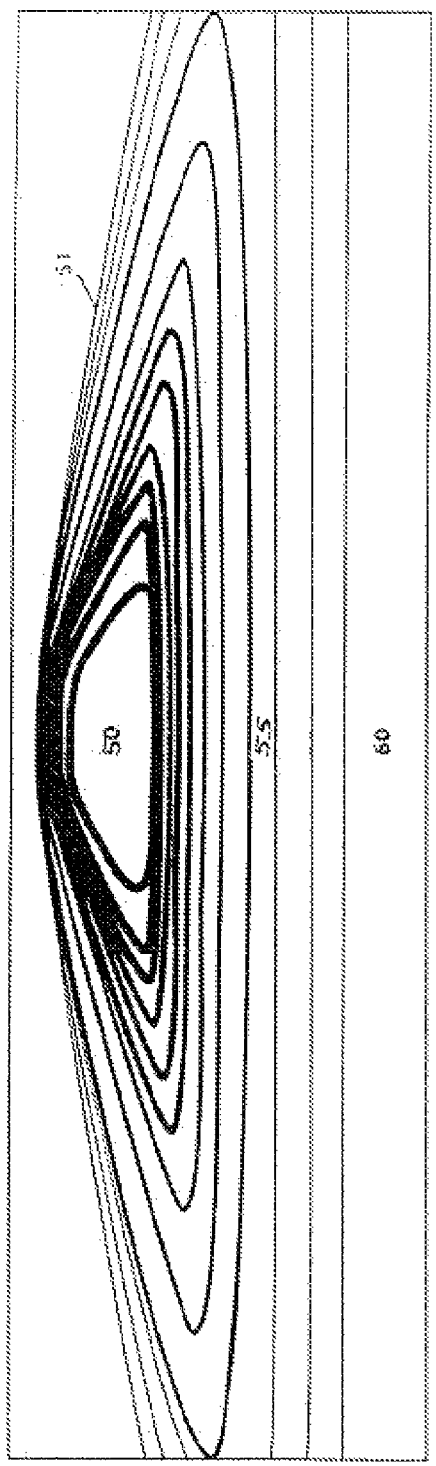
FIG. 5 shows an illustration of a light distribution from the point of view of the driver of the vehicle in the case of a normal operating situation.

FIG. 5 illustrates a light distribution on the basis of a line position. In this case, the lines 51 are lines of the same luminosity, wherein the center 50 is the region with the greatest luminosity and the luminosity decreases towards the outside towards regions 55 and 60. FIG. 5 illustrates a standard light distribution, as would be usable for a lower beam, an upper beam or a motorway light, for example. A light distribution which is symmetrical from right to left and has its maximum luminosity at a defined distance in front of the vehicle is shown.

Figure 6:
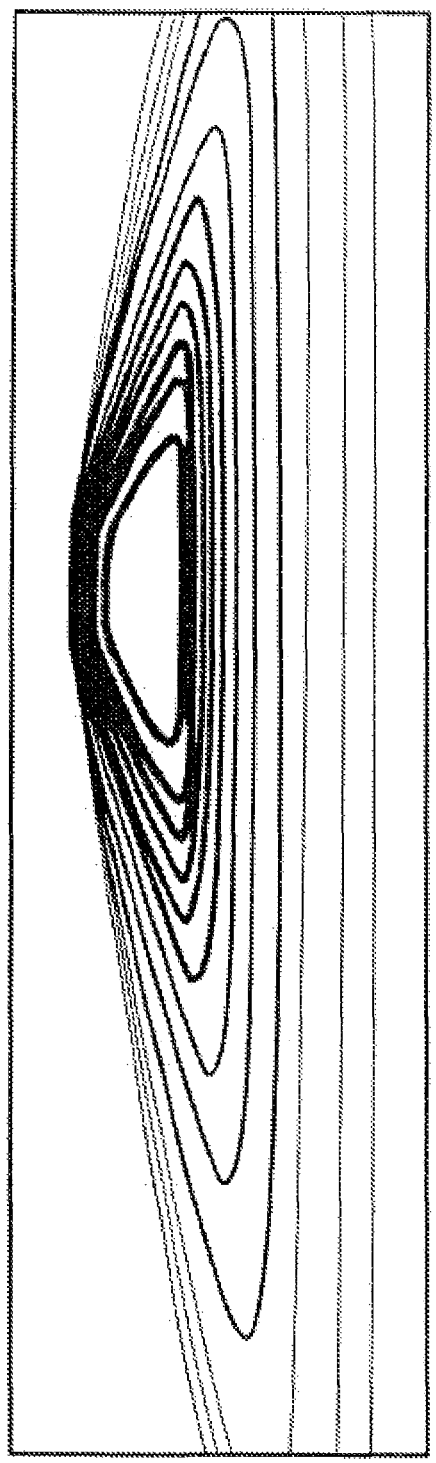
FIG. 6 shows an illustration of a light distribution from the point of view of the driver of the vehicle with deflection through a horizontal angle.

FIG. 6 illustrates an adapted light distribution on the basis of a linear model, which adapted light distribution represents a light distribution in the case of a horizontal pivoting angle. In this case, the light distribution is pivoted towards the right from the central position through a pivoting angle of the central line.

Figure 7:
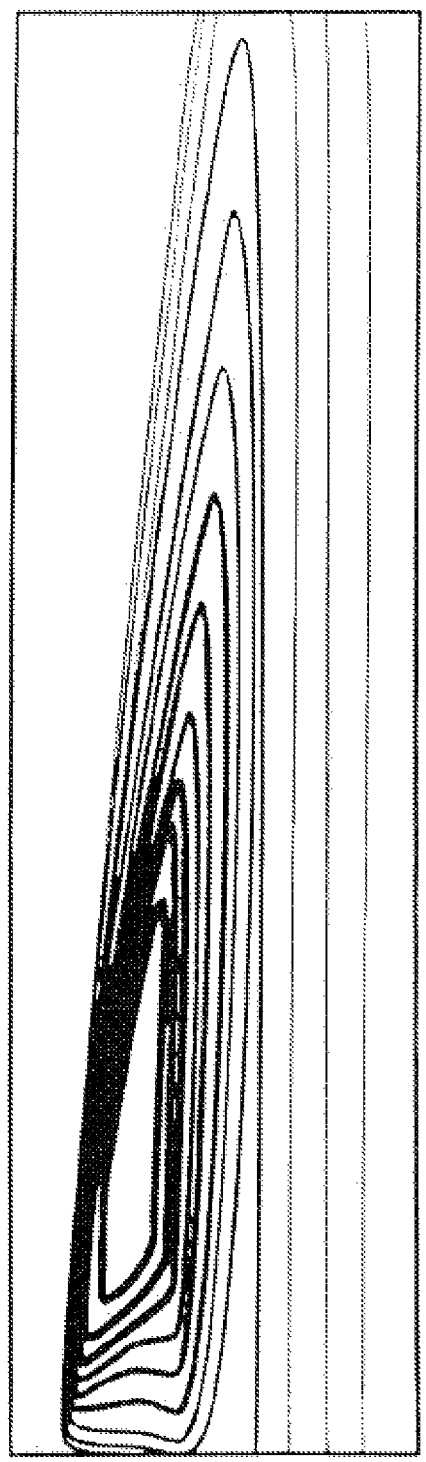
FIG. 7 shows an illustration of a light distribution from the point of view of the driver of the vehicle with deflection in the region of a bend towards the left.
Figure 8:
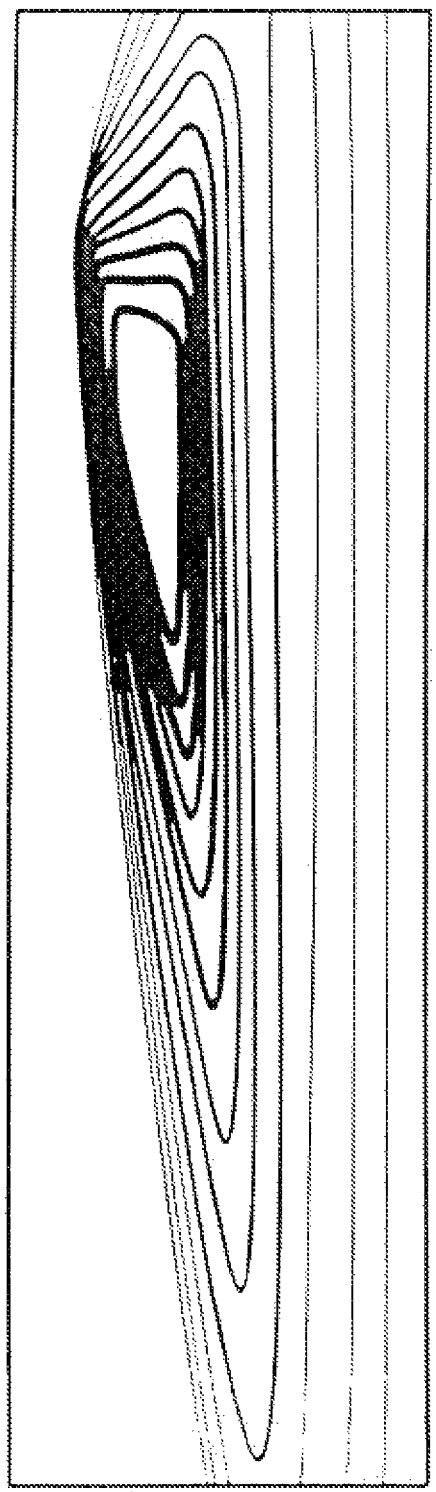
FIG. 8 shows an illustration of a light distribution from the point of view of the driver of the vehicle with deflection in the region of a bend towards the right.

FIGS. 7 and 8 illustrate an adapted light distribution on the basis of a linear model, which in each case represents a light distribution in the case of adaptation of a bend towards the left and towards the right, respectively. In this case, the light distribution is adjusted towards the left and towards the right, respectively, from the central position of a bend.

The invention claimed is:

1. A method for controlling illumination of a road profile, the method comprising:
  providing a headlamp comprising at least one light-emitting element and/or at least one shield element,
  determining a road profile as a function of the distance of the road region from the headlamp, wherein the road profile varies as a function of the distance of the road profile from the headlamp,
  individually driving the at least one light-emitting element and/or the at least one shield element in order to generate an individual luminous flux, wherein the light emitted by the at least one light-emitting element and/or the at least one shield element has a light distribution,
  laterally adapting the light-distribution based on a determined road profile as a function of a distance from the headlamp.

2. The method according to claim 1, wherein the light distribution is defined using a predefined three-dimensional basic distribution,
  further comprising performing matching of the light distribution to the profile of the road or the predicted trajectory of the specific vehicle or a suitable combination of the profile of the road and the trajectory on the basis of selected parameters.

3. The method according to claim 1, wherein the light distribution is adjusted in accordance with at least one of the following parameters:
  lateral lane profile
  vertical lane profile
  lateral offset of the lane
  angle of the lane profile
  curvature of the lane profile
  change in curvature of the lane profile
  lane width
  width profile of the lane
  predicted trajectory of the specific vehicle, in particular in a 3D environment.

4. The method according to claim 1, wherein the light distribution is determined in matched fashion three-dimensionally for various distance ranges.

5. The method according to claim 1, wherein a determination of the distance between the headlamp and the road is performed for various vertical angles and a correspondingly matched light distribution is determined for various distances resulting from the respective vertical angle.

6. The method according to claim 1, wherein the light distribution takes place by distortion of a three-dimensional parameter field of a three-dimensional light distribution model.

7. The method according to claim 1, wherein a defined luminosity profile is generated following a detected curved road profile.

8. A method for controlling illumination of a road profile, the method comprising:
providing a headlamp comprising a matrix of light-emitting elements or a matrix of shield elements, wherein each of the light-emitting elements or shield elements is individually drivable in order to generate an individual luminous flux, wherein the light emitted by the headlamp has a light distribution,
determining a road profile as a function of the distance of the road region from the headlamp, wherein the road profile is divided into a plurality of distance ranges,
generating a set models comprising a three-dimensional lighting model, a three-dimensional environment model, and a three-dimensional glare-suppression model,
using the set of models to generate a real adapted three-dimensional light distribution independently for each distance range in the plurality of distance ranges, and
driving each of the light-emitting elements or shield elements individually so that the real adapted three-dimensional light distribution is produced by the headlamp.

9. The method according to claim 8,
wherein the three-dimensional lighting model is produced using a first set of parameters, wherein the three-dimensional environment model is produced using a second set of parameters received from a sensor and/or a control unit, wherein the three-dimensional glare-suppression model is produced using a third set of parameters received from the sensor and/or the control unit.

10. The method according to claim 9,
further comprising producing a basic light distribution using the the three-dimensional lighting model, and
further comprising producing a region to be subjected to glare suppression and a region to be subjected to light reduction using the three-dimensional glare-suppression model.

11. The method according to claim 10,
further comprising generating an adapted basic light distribution using the basic light distribution and the three-dimensional environment model,
further comprising generating an adapted three-dimensional light distribution using the adapted basic light distribution, the region to be subjected to glare suppression, and the region to be subjected to light reduction, and
further comprising generating the real adapted three-dimensional light distribution using the adapted three-dimensional light distribution and a fourth set of parameters based on attributes of a design of the headlamp.

12. The method according to claim 9,
wherein the first set of parameters is selected from the group consisting of:
a profile of a lateral and/or longitudinal illumination in front of the headlamp,
a lateral and/or longitudinal lighting model in a forefield of the vehicle,
an upper beam spot, a direction and a set of characteristics of the upper beam spot, dependence thereof on a driving lane profile and a change in position, and deformation thereof,
a transition region between the upper beam spot and the forefield as a function of a solid angle,
a transition region between illumination of the roadway and the upper beam spot,
a profile of a driving lane to be lit,
a profile of the trajectory of the specific vehicle,
a glare suppression regions and forms for reducing the intensity of the light as a function of the solid angle, the distance from the object and the local headlamp intensity, and combinations thereof.

13. The method according to claim 9,
wherein the second set of parameters is selected from the group consisting of:
a type of road,
a road profile
a predicted vehicle trajectory,
a set of driving dynamics of the vehicle,
a traffic situation,
a hazard,
a weather condition,
a visual condition,
an external lighting,
a contrast in lighting,
a daylight and/or ambient luminosity
a vehicle position,
a vehicle orientation,
a velocity,
a set driving parameters,
a driver profile, a
a vehicle trajectory, and
combinations thereof.

14. The method according to claim 9,
wherein the third set of parameters is selected from the group consisting of:
a position of other vehicles,
a position of group of other vehicles,
a position of road users,
a position of retroreflectors,
a set of dynamics of other vehicles,
a set of dynamics of group of other vehicles,
a set of dynamics of road users, and/or
a set of dynamics of retroreflectors.

* * * * *